(12) United States Patent
Nema et al.

(10) Patent No.: US 8,280,055 B2
(45) Date of Patent: Oct. 2, 2012

(54) OPTICAL NETWORK SYSTEM AND METHOD OF CHANGING ENCRYPTION KEYS

(75) Inventors: Taiki Nema, Fujisawa (JP); Tohru Kazawa, Kokubunji (JP); Ryosuke Kurata, Chofu (JP)

(73) Assignee: Hitachi, Ltd., Tokyo (JP)

( * ) Notice: Subject to any disclaimer, the term of this patent is extended or adjusted under 35 U.S.C. 154(b) by 475 days.

(21) Appl. No.: 12/634,905

(22) Filed: Dec. 10, 2009

(65) Prior Publication Data

US 2010/0202612 A1    Aug. 12, 2010

(30) Foreign Application Priority Data

Feb. 9, 2009  (JP) ................................ 2009-027319

(51) Int. Cl.
*H04L 29/06* (2006.01)
(52) U.S. Cl. ........ 380/256; 380/283; 725/148; 725/149; 370/270; 713/153
(58) Field of Classification Search .................. None
See application file for complete search history.

(56) References Cited

U.S. PATENT DOCUMENTS

| | | | | |
|---|---|---|---|---|
| 8,086,872 | B2 * | 12/2011 | Kim et al. ...................... | 713/191 |
| 2002/0150097 | A1 * | 10/2002 | Yen et al. ...................... | 370/390 |
| 2007/0133800 | A1 * | 6/2007 | Kim et al. ...................... | 380/256 |
| 2008/0144622 | A1 * | 6/2008 | Platnic ........................... | 370/390 |
| 2009/0262937 | A1 * | 10/2009 | Hirth et al. .................... | 380/256 |

FOREIGN PATENT DOCUMENTS

| | | | |
|---|---|---|---|
| EP | 2040477 A1 | * | 3/2009 |
| GB | 2349314 A | * | 10/2000 |
| JP | 2004-343243 | | 12/2004 |
| JP | 2007-074168 | | 3/2007 |
| JP | 2007158962 A | * | 6/2007 |
| JP | 2007159147 A | * | 6/2007 |
| JP | 2007-306190 | | 11/2007 |
| JP | 2008-167483 | | 7/2008 |

OTHER PUBLICATIONS

ITU-T Recommendation G.984.3, "Gigabit-capable Passive Optical Networks (G-PON): Transmission convergence layer specification" (Mar. 2008).

* cited by examiner

*Primary Examiner* — Nathan Flynn
*Assistant Examiner* — Michael R Vaughan
(74) *Attorney, Agent, or Firm* — Antonelli, Terry, Stout & Kraus, LLP.

(57) ABSTRACT

An optical network system including an OLT and ONUs is provided that can prevent the loss of a multicast signal. When receiving an encryption key generation request from the OLT, the ONU generates an encryption key, and transmits the generated encryption key to the OLT. When receiving a notice of timing from the OLT, the ONU updates the encryption key of a belonging group. When receiving a report message from a STB through the ONU, the OLT analyzes the report message, stores a group that the STB belongs to as well as the ONU in a second table, and transmits the encryption key generation request to the ONU. When receiving the encryption key from the ONU, the OLT further stores the encryption key in the second table, and transmits to the ONU a notice of the timing in which the encryption key is valid.

4 Claims, 11 Drawing Sheets

| MAC ADDRESS (51) | IGMP GROUP (52) |
|---|---|
| AA-AA-AA-AA-AA-AA | 225.0.0.1 |
| BB-BB-BB-BB-BB-BB | 225.0.0.2 |
| CC-CC-CC-CC-CC-CC | 225.0.0.3 |
| ⋮ | ⋮ |

| BELONGING PORT (ANI PORT) (61) | ONU ID (Allocation-ID) (62) | KEY GENERATOR IDENTIFIER (63) | MAC ADDRESS (64) | IGMP GROUP (65) |
|---|---|---|---|---|
| 1 | 3 | 1 | AA-AA-AA-AA-AA-AA | 225.0.0.1 |
| 6 | 7 | 1 | BB-BB-BB-BB-BB-BB | 225.0.0.2 |
| 9 | 22 | 1 | CC-CC-CC-CC-CC-CC | 225.0.0.3 |
| 9 | 23 | 0 | DD-DD-DD-DD-DD-DD | 225.0.0.3 |
| 7 | 11 | 0 | EE-EE-EE-EE-EE-EE | 225.0.0.1 |
| 4 | 61 | 0 | FF-FF-FF-FF-FF-FF | 225.0.0.2 |
| 6 | 7 | 1 | AA-AA-AA-AA-AA-AA | 225.0.0.4 |
| ⋮ | ⋮ | ⋮ | ⋮ | ⋮ |

| Allocation-ID (71) | IGMP GROUP (72) | ENCRYPTION KEY (73) |
|---|---|---|
| 1 | 225.0.0.1 | ABCDEF12··· |
| 2 | 225.0.0.2 | AAAAAAAA··· |
| 3 | 225.0.0.3 | 21FEDCBA··· |
| ⋮ | ⋮ | ⋮ |

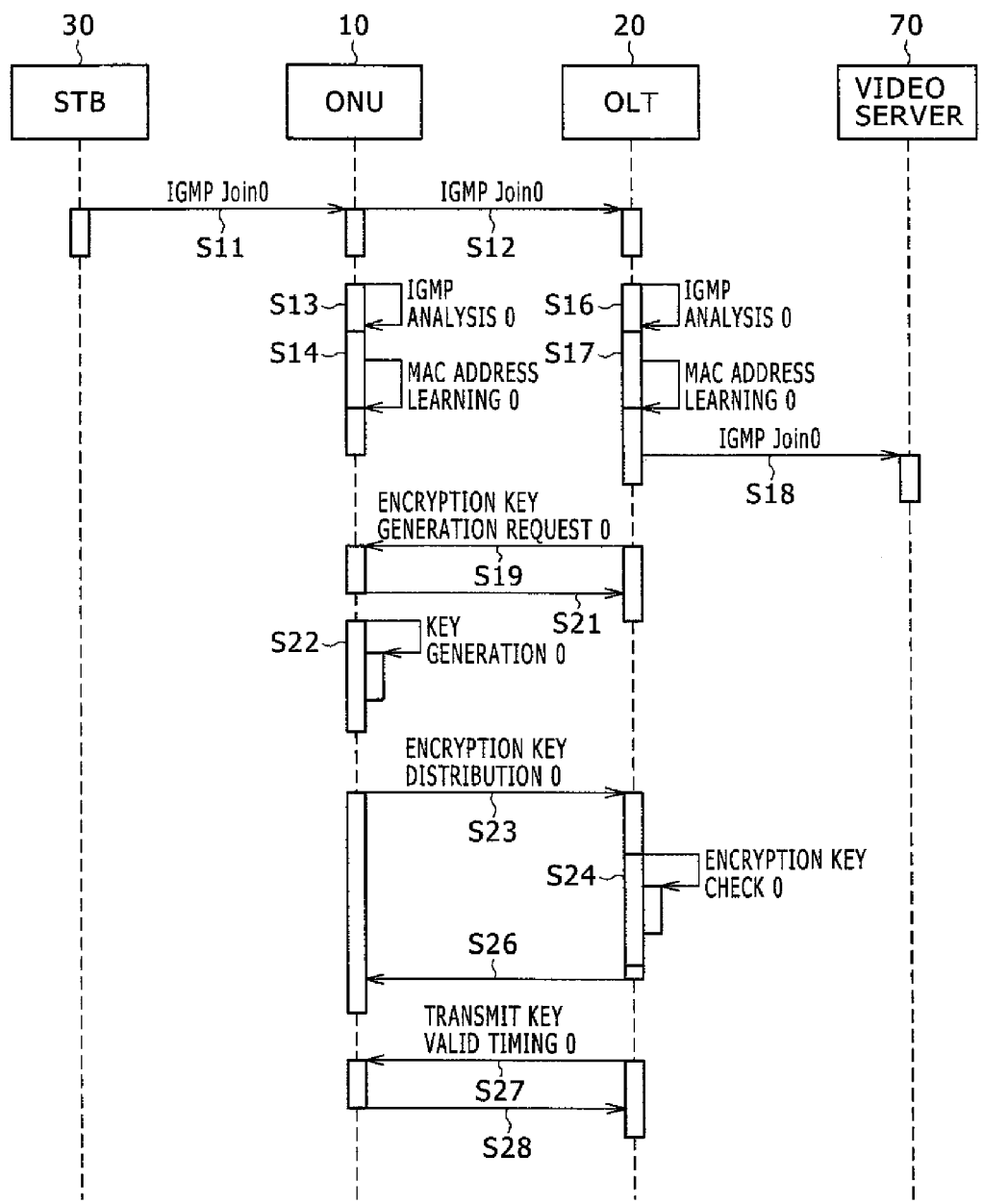

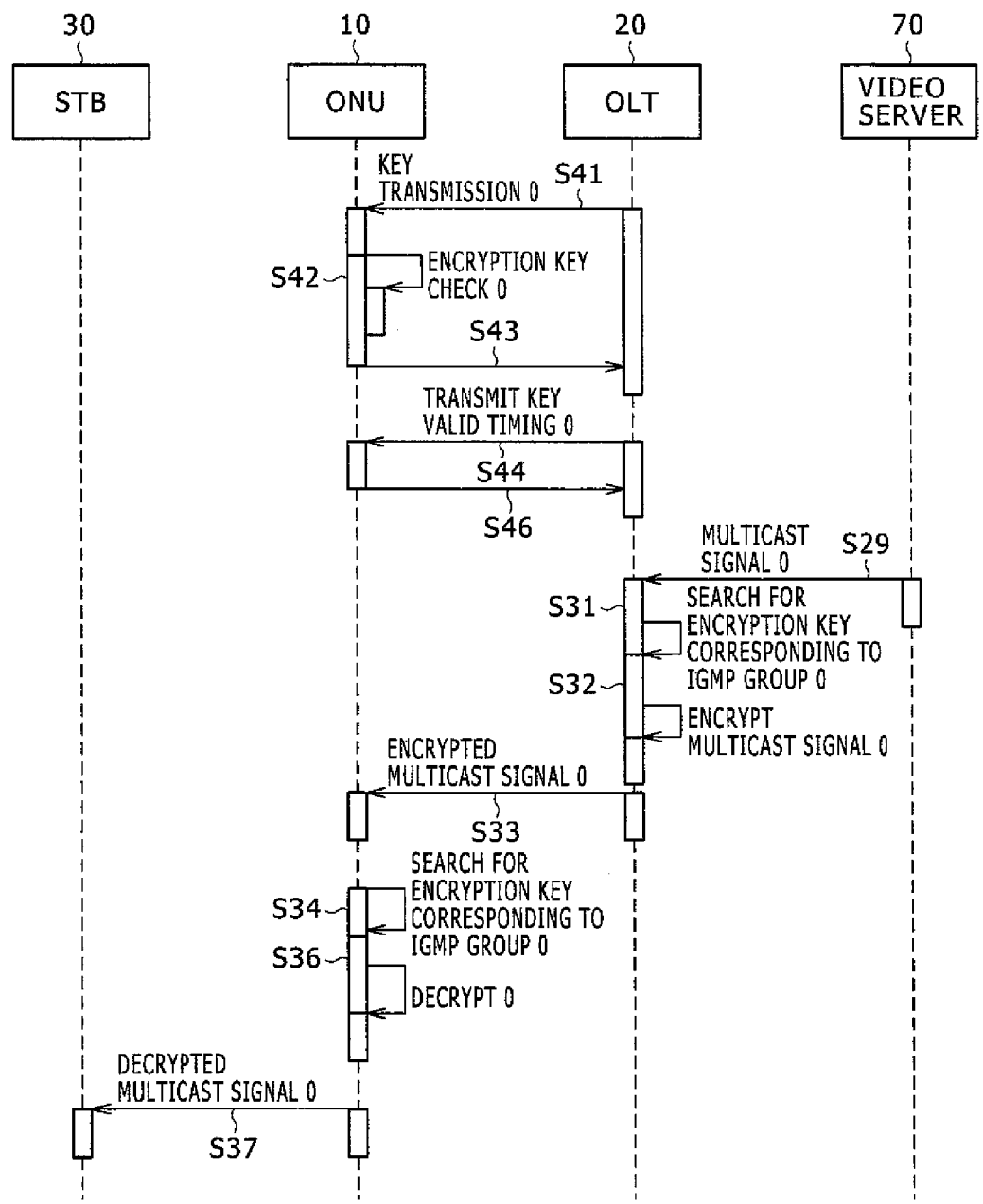

OPTICAL NETWORK SYSTEM AND METHOD OF CHANGING ENCRYPTION KEYS

CLAIM OF PRIORITY

The present application claims priority from Japanese patent application serial no. 2009-027319, filed on Feb. 9, 2009, the content of which is hereby incorporated by reference into this application.

BACKGROUND OF THE INVENTION

The present invention relates to a passive optical network (PON) system including an optical line terminal (OLT) and optical network units (ONUs). More particularly, the present invention relates to an optical network system without loss of multicast signals and to a method of changing encryption keys.

In recent years, the PON system has been widely used as an optical access system in providing broadband Internet access service to subscribers. The PON system includes an OLT, plural ONUs, and an optical fiber. The OLT and the ONUs are connected through an optical splitter to form a star network topology.

ITU-T Recommendation G.984.3, "Gigabit-capable Passive Optical Networks (G-PON): Transmission convergence layer specification" specifies the ONU-initiated encryption method and encryption key sharing method for unicast communication between OLT and ONU.

The methods include the following steps: a first step in which the OLT transmits an encryption key generation request to the ONU; a second step in which the ONU generates an encryption key; a third step in which the ONU transmits three times the generated encryption key to the OLT; a fourth step in which the OLT performs an error check on the encryption key received three times from the ONU; a fifth step in which the OLT transmits a positive confirmation response to the ONU; and a sixth step in which the OLT makes a notice of timing of changing the encryption key.

The unicast communication is designed to change the encryption key by the above steps to increase the confidentiality of information.

In the encryption method for a multicast signal such as an IP video signal in the PON system, the optical signal is physically split by an optical splitter in an optical distribution network (ODN) between an OLT and ONUS. Thus, a non-multicast signal can be tapped between the ONUS sharing an optical fiber connecting the OLT and the optical splitter. This problem has been solved in JP-A No. 343243/2004.

JP-A No. 343243/2004 discloses an OLT-initiated multicast encryption key distribution method in which the OLT stores, manages, and distributes a multicast encryption key for each Internet group management protocol (IGMP) group.

JP-A No. 074168/2007 discloses an encryption key change method for changing an encryption key when the key sharing and member leave a group in multicast communication.

SUMMARY OF THE INVENTION

However, there has been a difficulty in synchronizing the timing of changing an encryption key between an OLT and an ONU in multicast communication. Thus, the ONU has to be provided with a buffer for multicast signals to buffer an encrypted multicast signal in determining the change of the encryption key, in order to prevent signal loss. In this case, it is necessary to increase the number of buffers according to the number of distribution channels belonging to the ONU. Thus, there has been a problem of an increase in manufacturing cost.

The above problem can be solved by a PON system including an OLT and ONUs. The OLT has a function of analyzing an IGMP message, a function of associating an encryption group unit with the MAC address obtained as a result of the analysis, and a unit that encrypts a multicast signal based on the corresponding information between the IGMP message and the encryption group. The ONU has a function of analyzing an IGMP message, a function of associating an encryption key with the MAC address obtained as a result of the analysis, and a unit that identifies the multicast signal from the encryption key and the MAC address associated with the IGMP group, and decrypting the multicast signal. The OLT also has a unit that transmits a frame counter to the ONU from the OLT at the time of changing the encryption key. The ONU also has a function of detecting the timing of changing the encryption key from the received frame counter. In this way, it is possible to change the key for the multicast signal at a frame level without any signal interruption.

The above can be achieved by an optical network system including an OLT and ONUS. When receiving a report message from a set top box, the ONU analyzes the received report message, stores a group that the set top box belongs to as well as an address in a first table, and transfers the report message to the OLT. When receiving a request to generate an encryption key from the OLT, the ONU generates an encryption key, and transmits the generated encryption key to the OLT as an encryption key generation response. When receiving a notice of timing from the OLT, the ONU updates the encryption key of the belonging group. When receiving a report message from the set top box through the ONU, the OLT analyzes the report message, stores the group that the set top box belongs to as well as the ONU in a second table, and transmits the encryption key generation request to the ONU. When receiving the encryption key generation response from the ONU, the OLT further stores the encryption key in the second table, and transmits the notice of timing in which the encryption key is valid to the ONU.

Further, the above can be achieved by a method of changing encryption keys. The method includes the steps of: when receiving a report message from a set top box, analyzing the report message; storing a group that the set top box belongs to as well as an address in a first table; transferring the report message to the ONU; when receiving a report message from the set top box, analyzing again the report message; storing the group that the set top box belongs to as well as an ONU in a second table; transmitting an encryption key generation request to the ONU; when receiving the encryption key generation request from the OLT, generating an encryption key; transmitting the generated encryption key to the OLT as an encryption key generation response; when receiving the encryption key generation response from the ONU, further storing the encryption key in the second table; transmitting to the ONU a notice of timing in which the encryption key is valid; and when receiving the notice of the timing from the OLT, updating the encryption key of the belonging group.

The present invention specifies the ONU-initiated method of changing and distributing encryption keys suitable for multicast communication. Thus, the present invention can provide an optical network system that ensures confidentiality of multicast communication by encrypting the communication, as well as a method of changing encryption keys.

BRIEF DESCRIPTION OF THE DRAWINGS

FIG. 4 is a diagram showing a corresponding table between MAX addresses and IGMP groups;

FIG. 5 is a diagram showing a key generator management table managed by the OLT;

FIG. 6 is a diagram showing a key management table managed by the OLT;

FIG. 8A is a sequence diagram of encryption/decryption of a multicast signal in the PON system (part 1);

FIG. 8B is a sequence diagram of encryption/decryption of a multicast signal in the PON system (part 2);

DETAILED DESCRIPTION OF THE PREFERRED EMBODIMENT

Figure 1:
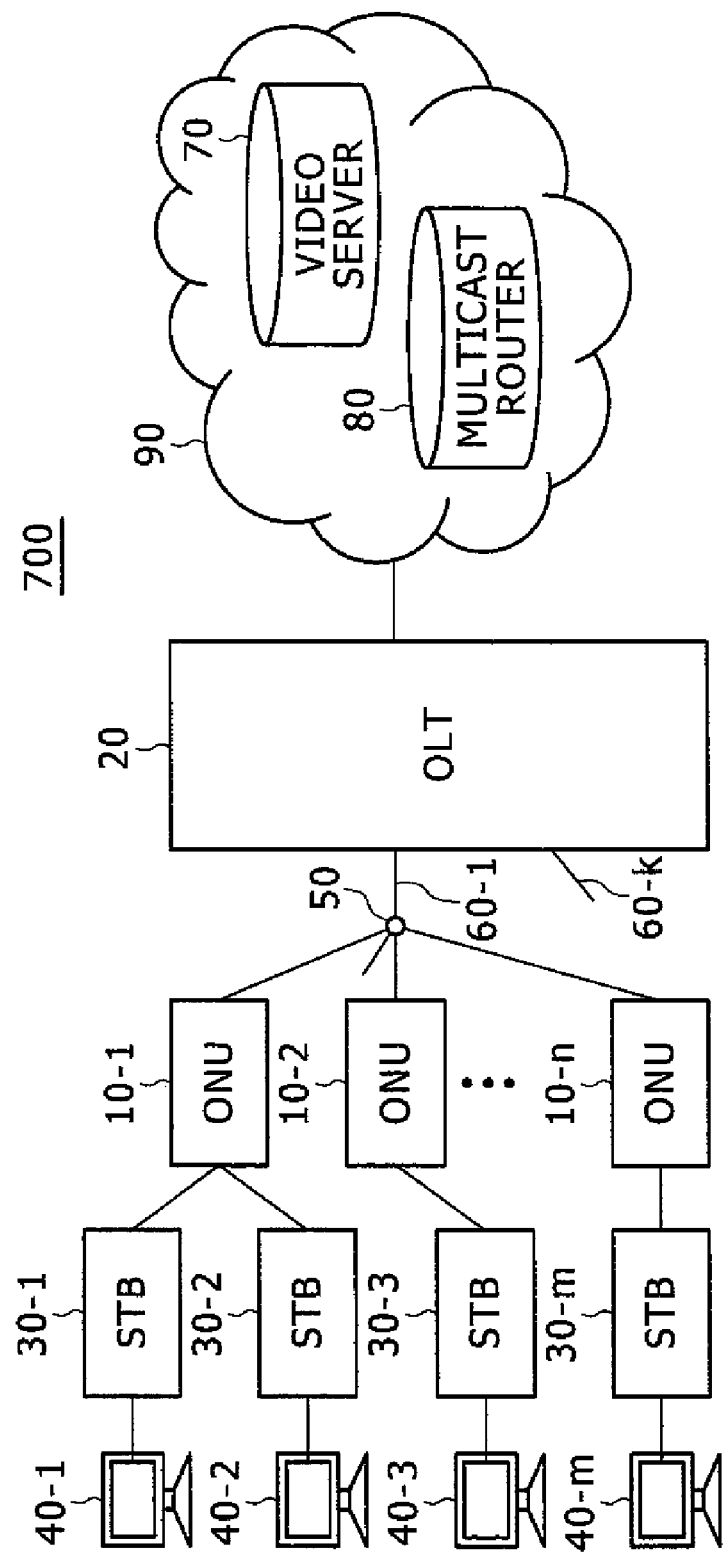
FIG. 1 is a block diagram of a PON system.

Hereinafter, an embodiment will be described with reference to the accompanying the drawings. Corresponding components are identified by the same reference numerals and the description will not be repeated.

The configuration of a PON system will be described with reference to FIG. 1. In FIG. 1, a PON system 700 includes an OLT 20 and n ONUs 10 connected to the OLT 20 by an optical distribution network with an optical fiber 60-1 and an optical splitter 50. The ONUs 10-1 to 10-n accommodate m set top boxes 30 allowing video to be viewed in subscribers' homes. Each of the set top boxes 30 is connected to a television 40. The OLT 20 is connected to a video server 70 and a multicast router 80 through an upper data distribution network 90. Further, the OLT 20 is connected with k optical distribution networks. In this embodiment, the optical splitter 50 may be replaced with an optical coupler. The video server 70 and the multicast router 80 distribute video signals.

Figure 2:
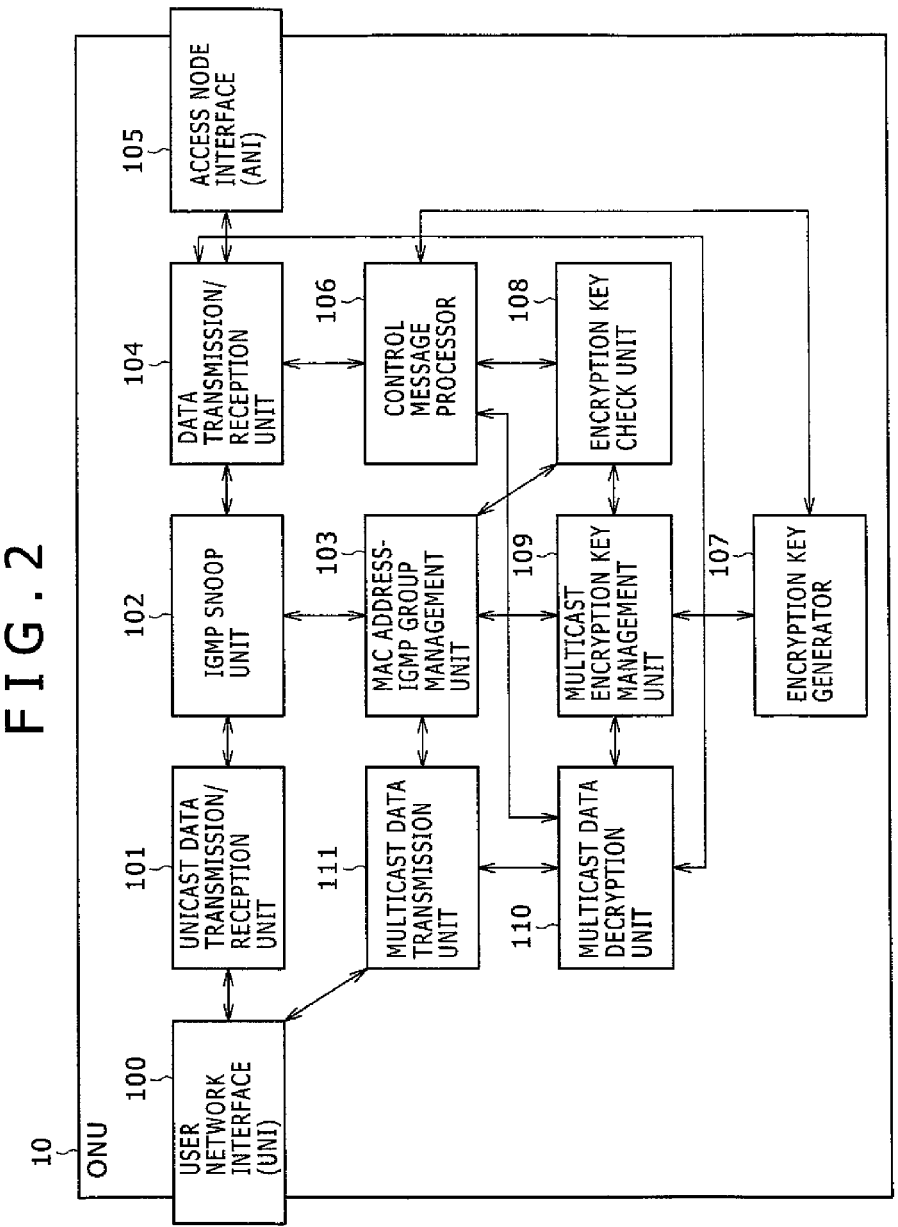
FIG. 2 is a functional block diagram of an ONU.

The configuration of the ONU will be described with reference to FIG. 2. In FIG. 2, the ONU 10 includes a user network interface (UNI) 100, a unicast data transmission/reception unit 101, an IGMP snoop unit 102, a MAC address-IGMP group management unit 103, a data transmission/reception unit 104, an access node interface (ANI) 105, a control message processor 106, an encryption key generator 107, an encryption key check unit 108, a multicast encryption key management unit 109, a multicast data decryption unit 110, and a multicast data transmission/reception unit 111.

The UNI 100 converts a signal received from the STB 30 into a frame signal, and transmits the signal to the unicast data transmission/reception unit 101. The UNI 100 converts the frame signal received from the unicast data transmission/reception unit 101 into an optical or electrical signal, and transmits the signal to the STB 30. The UNI 100 converts the frame signal received from the multicast data transmission/reception unit 111 into an optical or electrical signal, and transmits the signal to the STB 30. In this embodiment, the signal between the UNI 100 and the STB 30 can be an optical signal or an electrical signal.

The unicast data transmission/reception unit 101 transfers the frame signal received from the UNI 100 to the IGMP snoop unit 102. The unicast data transmission/reception unit 101 transfers the frame signal received from the IGMP snoop unit 102 to the UNI 100.

The IGMP snoop unit 102 analyzes only the IGMP signal of the frame signals received from the unicast data transmission/reception unit 101, and extracts the correspondence between the IGMP group and MAC address included in the signal. The IGMP snoop unit 102 transmits to the MAC address-IGMP group management unit 103 a request to record and store the correspondence between the IGMP group and the MAC address. When receiving a positive confirmation response from the MAC address-IGMP group management unit 103 as a response to the recording and storing request, the IGMP snoop unit 102 transmits the IGMP signal to the data transmission/reception unit 104. When receiving a negative confirmation response from the MAC address-IGMP group management unit 103 as a response to the recording and storing request, the IGMP snoop unit 102 discards the IGMP signal. The IGMP snoop unit 102 transmits the signals received from the unicast data transmission/reception unit 101, except for the IGMP signal, to the data transmission/reception unit 104. The IGMP snoop unit 102 transmits a decrypted user signal received from the data transmission/reception unit 104 to the unicast data transmission/reception unit 101.

The MAC address-IGMP group management unit 103 records and stores the correspondence information on the MAC address, the IGMP group, and the port ID. Upon receiving from the IGMP snoop signal unit 102 the request to record and store the correspondence between the MAC address and the IGMP group, the MAC address-IGMP group management unit 103 confirms the correspondence between the MAC address and the IGMP group. When the IGMP group is present as a result of the confirmation, the MAC address-IGMP group management unit 103 records and stores the correspondence information on the MAC address and the IGMP group. Then, the MAC address-IGMP group management unit 103 transmits a positive confirmation response to the IGMP snoop unit 102. When the IGMP group is not present as a result of the confirmation, the MAC address-IGMP group management unit 103 discards the correspondence information on the MAC address and the IGMP group. Then, the MAC address-IGMP group management unit 103 transmits a negative confirmation response to the IGMP snoop unit 102.

The data transmission/reception unit 104 encrypts the frame signal received from the IGMP snoop unit 102, and transmits the signal to the ANI 105. The data transmission/reception unit 104 decrypts the unicast signal received from the ANI 105, and determines whether the signal is a control signal or a user signal. When receiving a control signal from the ANI 105, the data transmission/reception unit 104 transmits the control signal to the control message processor 106. When receiving a user signal from the ANI 105, the data transmission/reception unit 104 transmits the user signal to the IGMP snoop unit 102.

The ANI 105 converts the frame signal received from the data transmission/reception unit 104 into an optical signal, and transmits the optical signal to the OLT 20. The ANI 105 converts an optical signal received from the OLT 20 into a frame signal, and transmits the frame signal to the data transmission/reception unit 104.

The control message processor 106 analyzes the control signal received from the data transmission/reception unit 104. When the analysis result is a request to generate an encryption key, the control message processor 106 transmits the encryption key generation request to the encryption key generator 107. When the analysis result is a request to update the key information of the IGMP group, the control message processor 106 extracts the encryption key, and transmits the extracted encryption key to the encryption key check unit 108. When receiving a negative confirmation response from the encryption key check unit 108, the control message processor 106 transmits an encryption key redistribution request to the data transmission/reception unit 104 as a control signal.

Upon receiving the encryption key generation request from the control message processor 106, the encryption key generator 107 generates an encryption key. The encryption key generator 107 transmits the generated encryption key to the control message processor 106.

The encryption key check unit 108 checks the encryption key received from the control message processor 106 to determine if there is a bit error. When no error is found in the encryption key, the encryption key check unit 108 transmits to the multicast encryption key management unit 109 a request to update the encryption key. When no error is found in the encryption key, the encryption key check unit 108 transmits a positive confirmation response to the control message unit 106. When an error is found in the encryption key, the encryption key check unit 108 transmits a negative confirmation response to the control message processor 106.

The multicast encryption key management unit 109 records and stores the correspondence information on the Allocation-ID, the IGMP group, and the encryption key. In response to the request from the multicast data decryption unit 110, the multicast encryption key management unit 109 transmits the correspondence information on the IGMP group and the encryption key.

The multicast data decryption unit 110 decrypts the encrypted multicast signal. The multicast data decryption unit 110 receives a frame timing in which the encryption key is valid, and updates the encryption key at the frame timing.

The multicast data transmission/reception unit 111 transmits the decrypted multicast signal received from the multicast data decryption unit 110 to the UNI 100.

The ONU 10 receives an IGMP report message (Join) from the STB 30 belonging to the ONU 10, by the UNI 100. Then, the IGMP report message (Join) is passed to the IGMP snoop unit 102 through the unicast data transmission/reception unit 101.

The IGMP snoop unit 102 analyzes the IGMP report message (Join). When the MAC address is unknown as a result of the analysis, the MAC address-IGMP group management unit 103 registers the MAC address of the STB and the IGMP group thereof as the management targets. When the MAC address is known, the MAC address-IGMP group management unit 103 rewrites the IGMP group corresponding to the MAC address. Meanwhile, the IGMP snoop unit 102 transparently transfers the IGMP report (Join) message to the data transmission/reception unit 104. The data transmission/reception unit 104 converts the received message to an encrypted frame used in the transmission on the ANI side. Then, the data transmission/reception unit 104 transmits the encrypted frame to the OLT 20 through the ANI 105.

Figure 3:
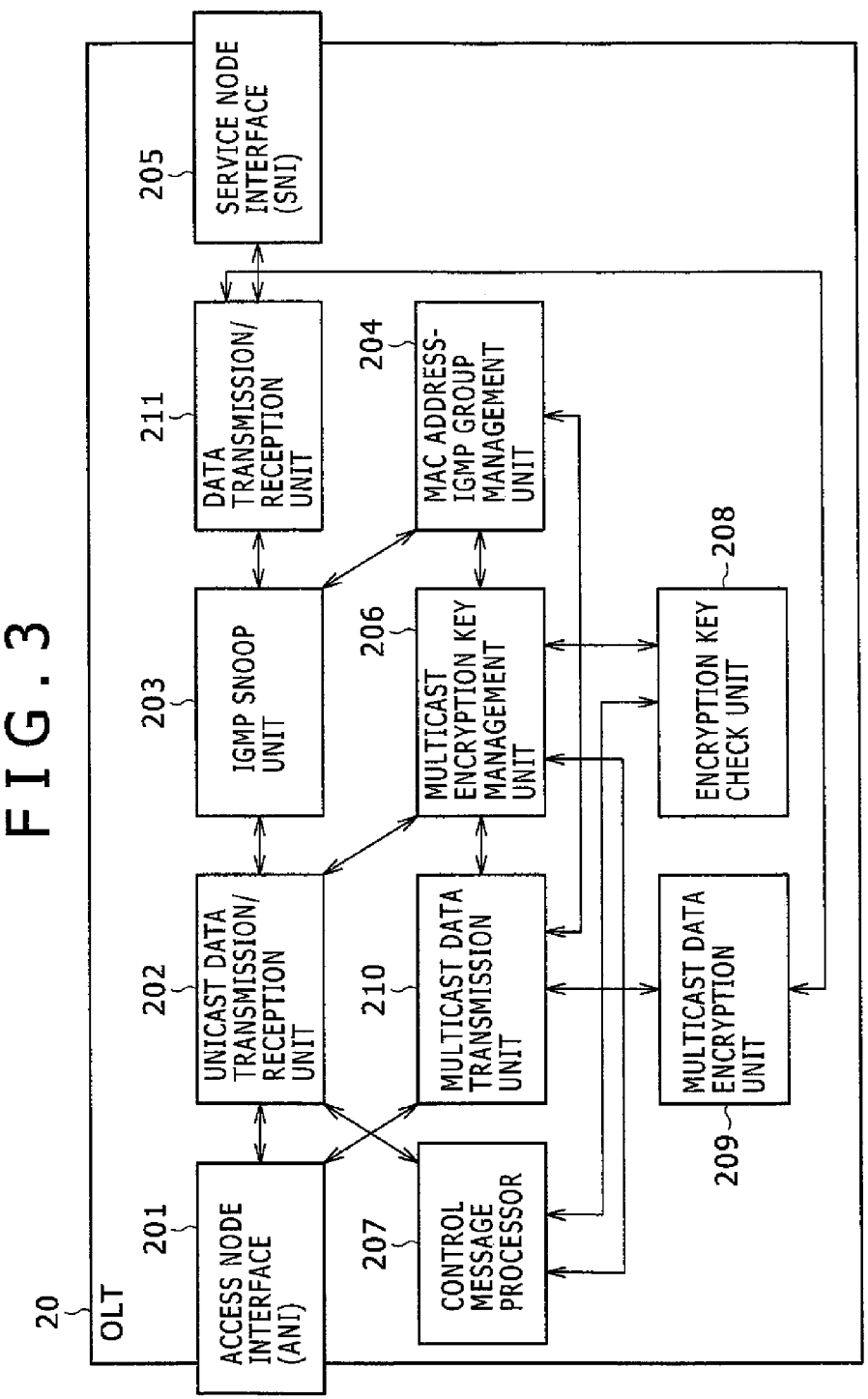
FIG. 3 is a functional block diagram of an OLT.

The configuration of the OLT will be described with reference to FIG. 3. In FIG. 3, the OLT 20 includes an access node interface (ANI) 201, a unicast data transmission/reception unit 202, an IGMP snoop unit 203, a MAC address-IGMP group management unit 204, a service node interface (SNI) 205, a multicast encryption key management unit 206, a control message processor 207, an encryption key check unit 208, a multicast encryption key management unit 209, a multicast data transmission unit 210, and a data transmission/reception unit 211.

The ANI 201 converts a frame signal received from the unicast data transmission/reception unit 202 into an optical signal, and transmits the optical signal to the ONU 10. The ANI 201 converts a frame signal received from the multicast data transmission/reception unit 202 into an optical signal, and transmits the optical signal to the ONU 10. The ANI 201 converts an optical signal received from the ONU 10 into a frame signal, and transmits the frame signal to the unicast data transmission/reception unit 202.

The unicast data transmission/reception unit 202 transfers the frame signal received from the ANI 201 to the IGMP snoop unit 203. The unicast data transmission/reception unit 202 transfers the frame signal received from the IGMP snoop unit 203 to the ANI 201.

The IGMP snoop unit 203 analyzes only the IGMP signal of the frame signals received from the unicast data transmission/reception unit 202. The IGMP snoop unit 203 extracts the correspondence between the IGMP group and MAC address included in the IGMP signal, and the port ID at which the frame is received. The IGMP snoop unit 203 transmits to the MAC address-IGMP group management unit 204 a request to record and store the correspondence between the IGMP group, the MAC address, and the port ID at which the frame is received. When receiving a positive confirmation response from the MAC address-IGMP group management unit 204, the IGMP snoop unit 203 transmits the IGMP signal to the data transmission/reception unit 211. When receiving a negative confirmation response from the MAC address-IGMP group management unit 204, the IGMP snoop unit 203 discards the IGMP signal.

The MAC address-IGMP group management unit 204 records and stores the correspondence information on the MAC address, the IGMP group, and the ANI port ID. The MAC address-IGMP group management unit 204 receives from the IGMP snoop unit 203 a request to record and store the correspondence information on the IGMP group, the MAC address, and the ANI port ID at which the frame is received. When the MAC address is known, the MAC address-IGMP group management unit 204 updates the correspondence information on the IGMP group, the MAC address, and the port ID at which the frame is received. When the IGMP group is present, the MAC address-IGMP group management unit 204 transmits a positive confirmation response to the IGMP snoop unit 203. When the IGMP group is not present, the MAC address-IGMP group management unit 204 transmits a negative confirmation response to the IGMP snoop unit 203, and newly registers the correspondence information on the IGMP group, the MAC address, and the port ID at which the frame is received.

The SNI 205 transmits the unicast signal received from the IGMP snoop unit 203 to the upper network. The SNI 205 transmits the multicast signal received from the upper network to the multicast data encryption unit 209. The SNI 205 transmits the unicast signal received from the upper network to the IGMP snoop unit 203.

The multicast encryption key management unit 206 records, stores, and updates the correspondence information on the belonging physical port (ANI port), the ONU ID, the key generator identification, the MAC address, and the IGMP group. The multicast encryption key management unit 206 records, stores, and updates the correspondence relation between the Allocation-ID, the IGMP group, and the encryption key. When the IGMP group is newly generated, the multicast encryption key management unit 206 transmits to the ONU 10 a request to generate an encryption key. When the IGMP group is present, the multicast encryption key management unit 206 selects one ONU 10 belonging to the IGMP group, and transmits a request to generate an encryption key. The multicast encryption key management unit 206 responds to an inquiry from the multicast data encryption unit 209 about the encryption key corresponding to the IGMP group.

The control message processor 207 transmits an encryption key generation request to the ONU 10. The control message processor 207 transmits to the ONU 10 the timing in which the encryption key is valid. When the encryption key is changed in the IGMP group, the control message processor 207 notifies all the ONUs 10 belonging to the IGMP group about the encryption key.

The encryption key check unit 208 checks for the presence of an error in the encryption key. The multicast data encryption unit 209 encrypts the multicast data by using the encryption key.

After the multicast data is encrypted by the multicast data encryption unit 209, the multicast data transmission unit 210 transmits the encrypted multicast signal to the ANI 201.

The data transmission/reception unit 211 transmits the unicast signal received from the SNI 205 to the IGMP snoop unit 203. The data transmission/reception unit 211 transmits the unicast signal received from the IGMP snoop unit 203 to the SNI 205. The data transmission/reception unit 211 transmits the multicast signal received from the SNI 205 to the multicast data encryption unit 209.

A corresponding table between MAC addresses and IGMP groups will be described with reference to FIG. 4. In FIG. 4, a MAC address-IGMP group corresponding table 50 includes a MAC address 51 and an IGMP group 52. The MAC address-IGMP group corresponding table 50 is held by the MAC address-IGMP group management unit 103 of the ONU 10, and by the MAC address-IGMP group management unit 204 of the OLT 20. The MAC address 51 represents the MAC address of the ONU 10. The IGMP group 52 represents the identifier of the IGMP group that the ONU 10 belongs to.

A key management table will be described with reference to FIG. 5. In FIG. 5, a key generator management table 60 includes a belonging port (ANI port) 61, an ONU ID (Allocation-ID) 62, a key generator identifier 63, a MAC address 64, and an IGMP group 65. The key generator management table 60 is managed by the multicast encryption key management unit 206 of the OLT 20. The port 61 represents the physical PON port that the ONU 10 connected to the OLT 20 belongs to. The ONU ID 62 represents the ID of the ONU. The key generator identifier 63 identifies whether the key generator or not. The MAC address 64 represents the MAC address of the ONU. The IGMP group 65 represents the identifier of the IGMP group that the ONU belongs to. In the key generator identifier 63, "1" means the key generator while "0" means not the key generator.

An encryption key management table will be described with reference to FIG. 6. In FIG. 6, an encryption key management table 70 includes an Allocation-ID 71, an IGMP group 72, and an encryption key 73. The encryption key management table 70 is managed by the multicast encryption key management unit 109 of the ONU 10, and by the multicast encryption key management unit 206 of the OLT 20. The Allocation-ID 71 represents the ID of the ONU. The IGMP group 72 represents the identifier of the IGMP group that the ONU belongs to. The encryption key 73 represents the encryption key for the IGMP group. It should be noted that the encryption key management table 70 may include the retention period of each encryption key.

Figure 7:
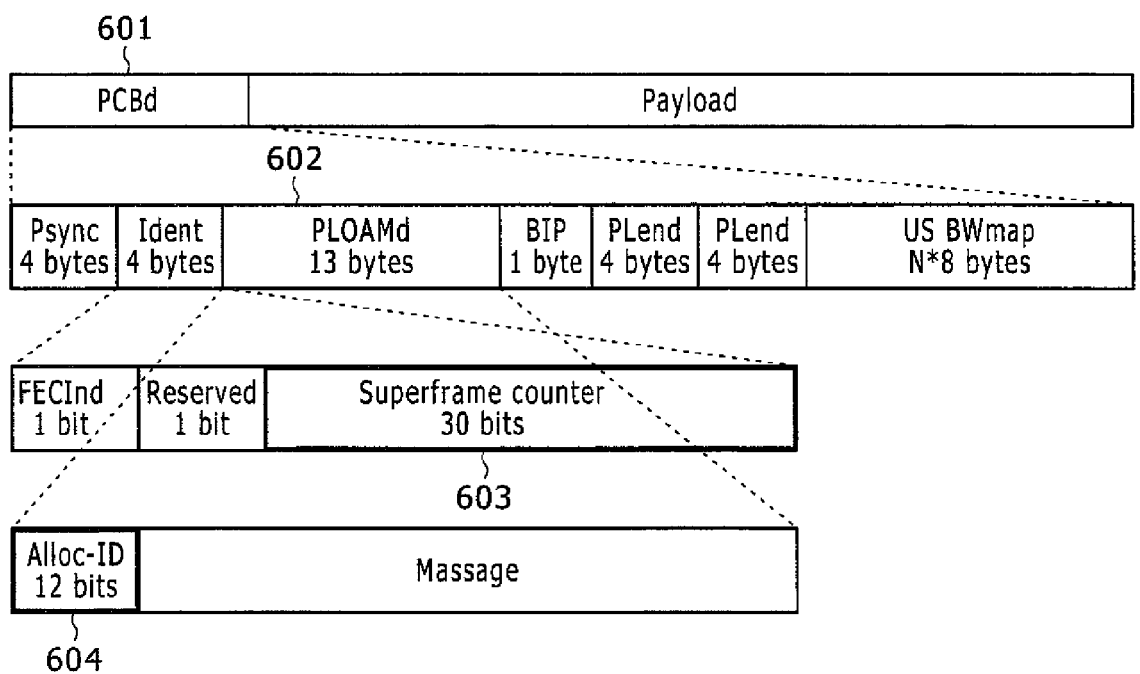
FIG. 7 is a diagram showing a downstream frame format.

A downstream frame format will be described with reference to FIG. 7. In FIG. 7, a downstream frame format 600 includes PCBd 601 and a payload. The PCBd 601 is a physical control block (d: downstream) field, representing a control signal with respect to the downstream signal. The PCBd 601 is a field that contains Psync, Ident, PLOAMd 602, BIP, PLend, PLend, and US BWmap. The PLOAMd 602 represents the control signal, in particular, for the operation, administration, and maintenance of the physical layer in a downstream signal.

The Ident field contains FEC Ind, Reserved, and Superframe counter 603. The Superframe counter 603 represents the timing of changing the encryption key. The PLOAMd 602 is a field that contains Alloc-ID 604 and Message. The Alloc-ID 604 is an Allocation-ID field in which the identifier representing the ONU in the unicast signal is described. Further, the Alloc-ID 604 is a field in which the identifier uniquely corresponding to the IGMP group in the encrypted multicast signal is described.

Multicast signal encryption and decryption processes will be described with reference to FIGS. 8A and 8B. In the following description, it is assumed that an IGMP group is newly generated. In FIG. 8A, the STB 30 transmits IGMP Join to the ONU 10 (S11). The ONU 10 transmits IGMP Join to the OLT 20 (S12). The ONU 10 performs IGMP analysis (S13). The ONU 10 performs MAC address learning (S14). The OLT 20 performs IGMP analysis (S16). The OLT 20 performs MAC address leaning (S17). The OLT 20 transmits IGMP Join to the video server 70 (S18).

The OLT 20 transmits an encryption key generation request to the ONU 10 (S19). The ONU 10 transmits ACK to the OLT 20 (S21). The ONU 10 generates an encryption key (S22). The ONU 10 transmits the encryption key to the OLT 20 (S23). The OLT 20 checks the encryption key (S24). The OLT 20 transmits ACK to the ONU 10 (S26). The OLT 20 transmits a key valid timing to the ONU 10 (S27). The ONU 10 transmits ACK to the OLT 20 (S28).

In FIG. 8B, the video server 70 transmits a multicast signal to the OLT 20 (S29). The OLT 20 searches for an encryption key corresponding to the IGMP group (S31). The OLT 20 encrypts the multicast signal (S32). The OLT 20 transmits the encrypted multicast signal to the ONU 10 (S33). The ONU 10 searches for an encryption key corresponding to the IGMP group (S34). The ONU 10 decrypts the encrypted multicast signal (S36). The ONU 10 transmits the decrypted multicast signal to the STB 30 (S37).

On the other hand, when the IGMP group is present, the process moves to step 41 after completion of steps 11 to 17. In step 41, the OLT 20 transmits the encryption key to the ONU 10 (S41). The ONU 10 checks the encryption key (S42). The ONU 10 transmits ACK to the OLT 20 (S43). The OLT 20 transmits the timing in which the encryption key is valid to the ONU 10 (S44). The ONU 10 transmits ACK to the OLT 20 (S46). The following steps are the same as the steps from S20 to S37.

Figure 9:
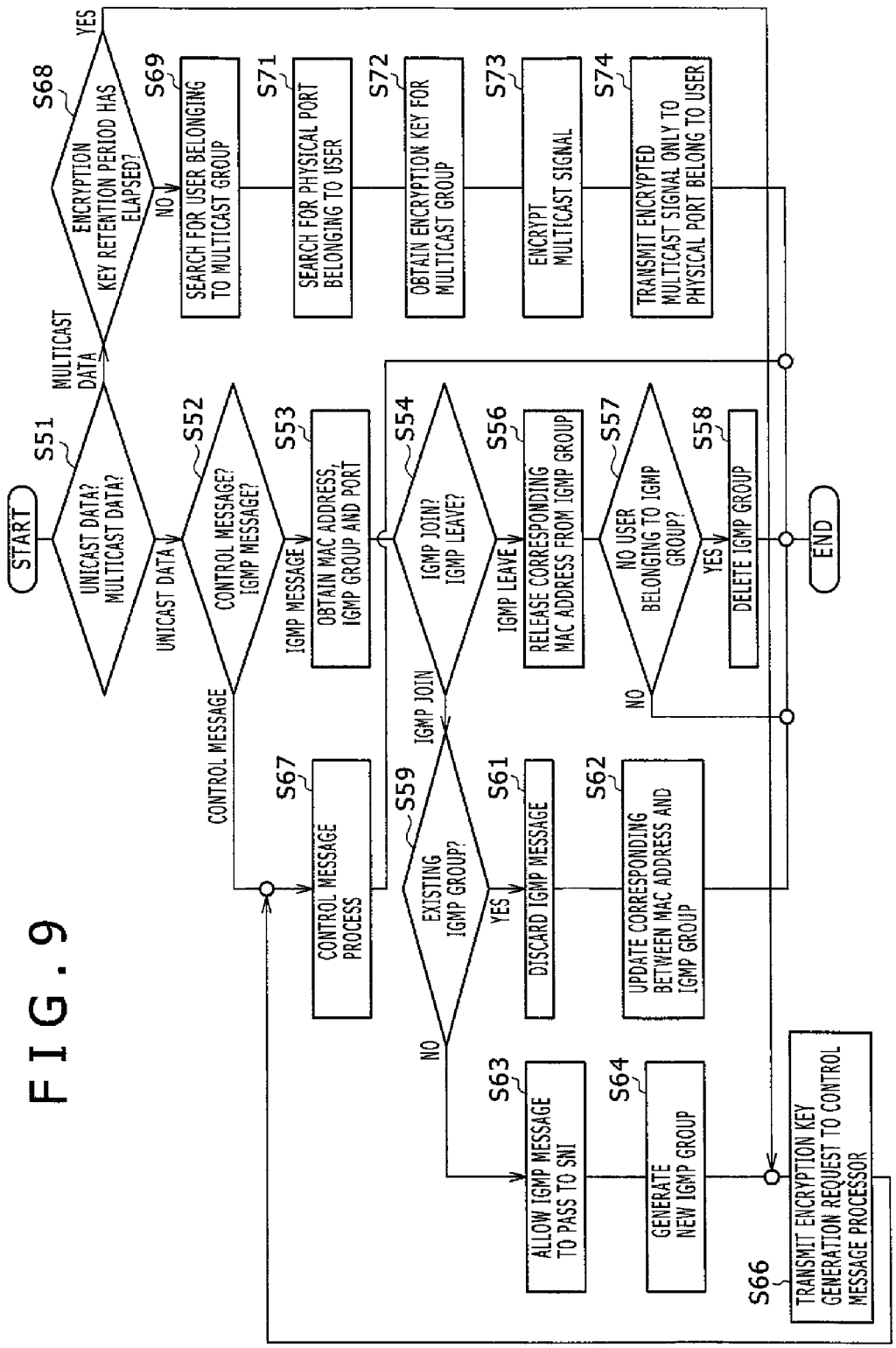
FIG. 9 is a flowchart of the operation of the OLT.
Figure 10:
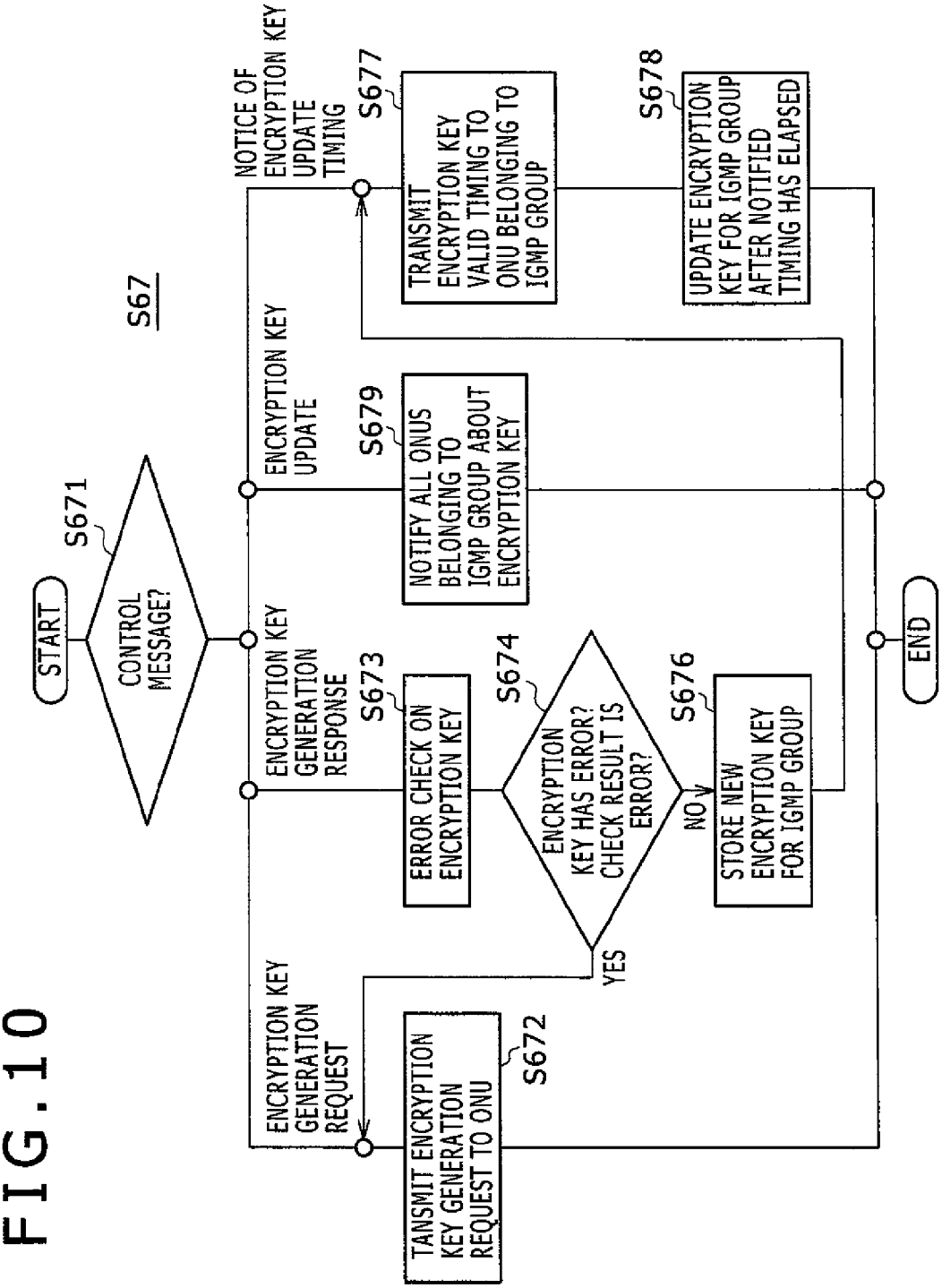
FIG. 10 is a flowchart of the control message process of the OLT.

A flowchart of the process of the OLT will be described with reference to FIGS. 9 and 10. In FIG. 9, the OLT 20 determines whether the received data is unicast data or multicast data (S51). When the received data is unicast data, the OLT 20 determines whether the data is a control message or an IGMP message (S52). When the data is an IGMP message, the OLT 20 obtains the MAC address, the IGMP group, and the port (S53). The OLT 20 determines whether the message is IGMP join or IGMP leave (S54). When the message is IGMP leave, the OLT 20 releases the corresponding MAC address from the IGMP group (S56). The OLT 20 determines the presence or absence of the user belonging to the IGMP group (S57). When the answer is YES, the OLT 20 deletes the IGMP group (S58), and ends the process.

When the answer is NO in step 57, the OLT 20 just ends the process. When the message is IGMP join in step 54, the OLT 20 determines whether the IGMP group is already present (S59). When the answer is YES, the OLT 20 discards the IGMP message (S61). The OLT 20 updates the key generator management table 60 (S62), and ends the process.

When the answer is NO in step 59, the OLT 20 allows the IGMP message to pass to the SNI 205 (S63). The OLT 20 generates a new IGMP group (S64). The OLT 20 transmits an encryption key generation request to the control message processor 207 (S66). The OLT 20 performs a control message process (S67), and ends the process.

When the message is a multicast data in step 51, the OLT 20 determines whether the retention period of the encryption key has elapsed (S68). When the answer is YES, the OLT 20 moves the process to step 66. When the answer is NO in step 68, the OLT 20 searches for a user belonging to the multicast group (S69). The OLT 20 searches for a physical port that the user belongs to (S71). The OLT 20 obtains the encryption key for the multicast group (S72). The OLT 20 encrypts the multicast signal (S73). The OLT 20 transmits the encrypted multicast signal only to the physical port that the user belongs to (S74), and ends the process.

Further detail of step 67 will be described with reference to FIG. 10. In step 67, the OLT 20 determines the type of the control message (S671). When the message is an encryption key generation request, the OLT 20 transmits the encryption key generation request (S672), and ends the process. When the message is an encryption key generation response in step 671, the OLT 20 performs an error check on the encryption key (S673). The OLT 20 determines whether the result of the error check is an error (S674). When the answer is NO, the OLT 20 stores a new encryption key for the IGMP group (S676). The OLT 20 transmits the encryption timing to the ONU 10 belonging to the IGMP group (S677). The OLT 20 updates the encryption key management table 70 at the notified timing (S678), and ends the process.

When the message is an encryption key update in step 671, the OLT 20 transmits the encryption key to all the ONUs belonging to the IGMP group (S679), and ends the process. When the message is a notice of encryption key update timing in step 671, the OLT 20 moves to step 677.

It is also possible that the message including the IGMP report message, the encryption key generation request, and the encryption key generation response are communicated through an encryption unicast channel.

Figure 11:
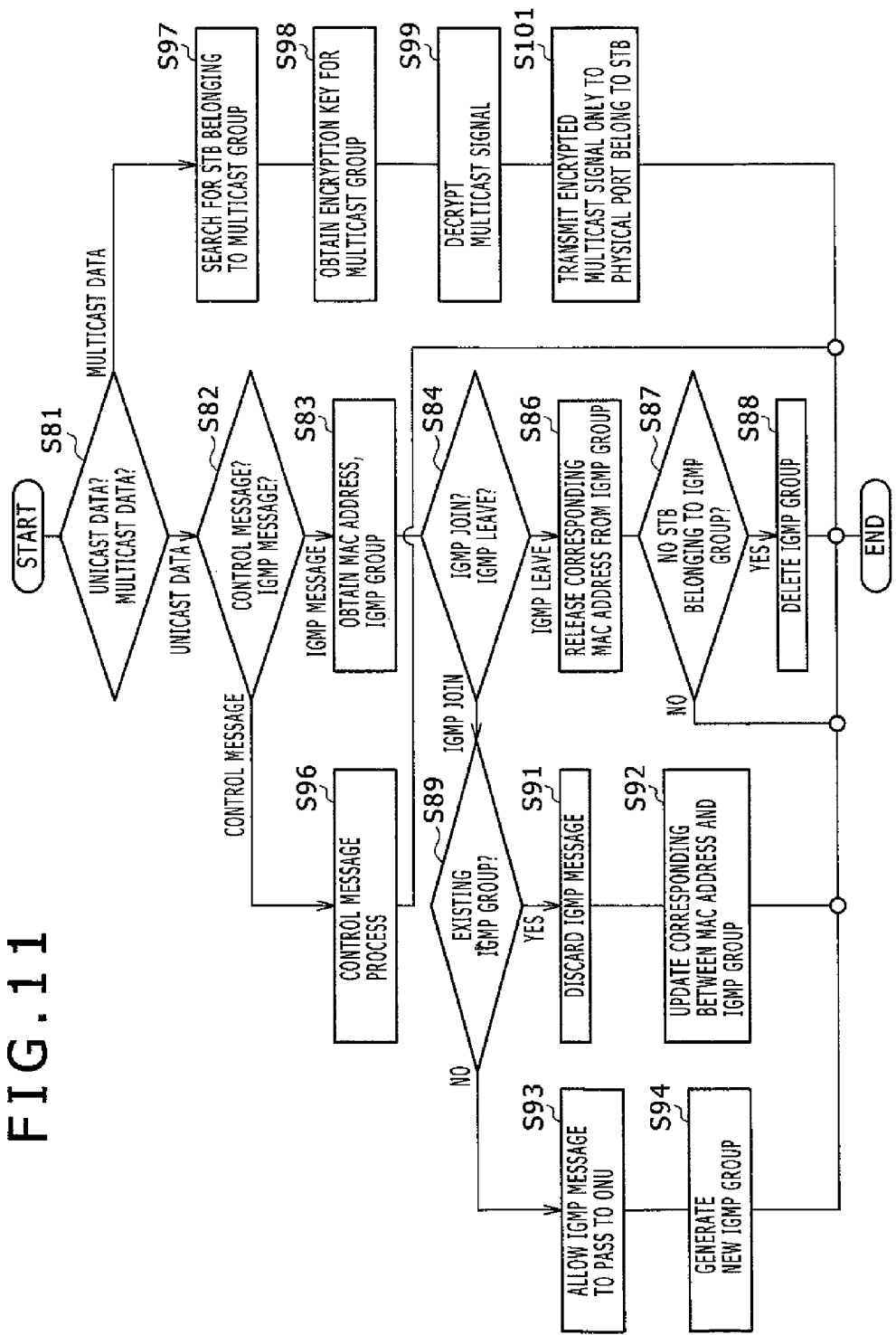
FIG. 11 is a flowchart of the operation of the ONU.
Figure 12:
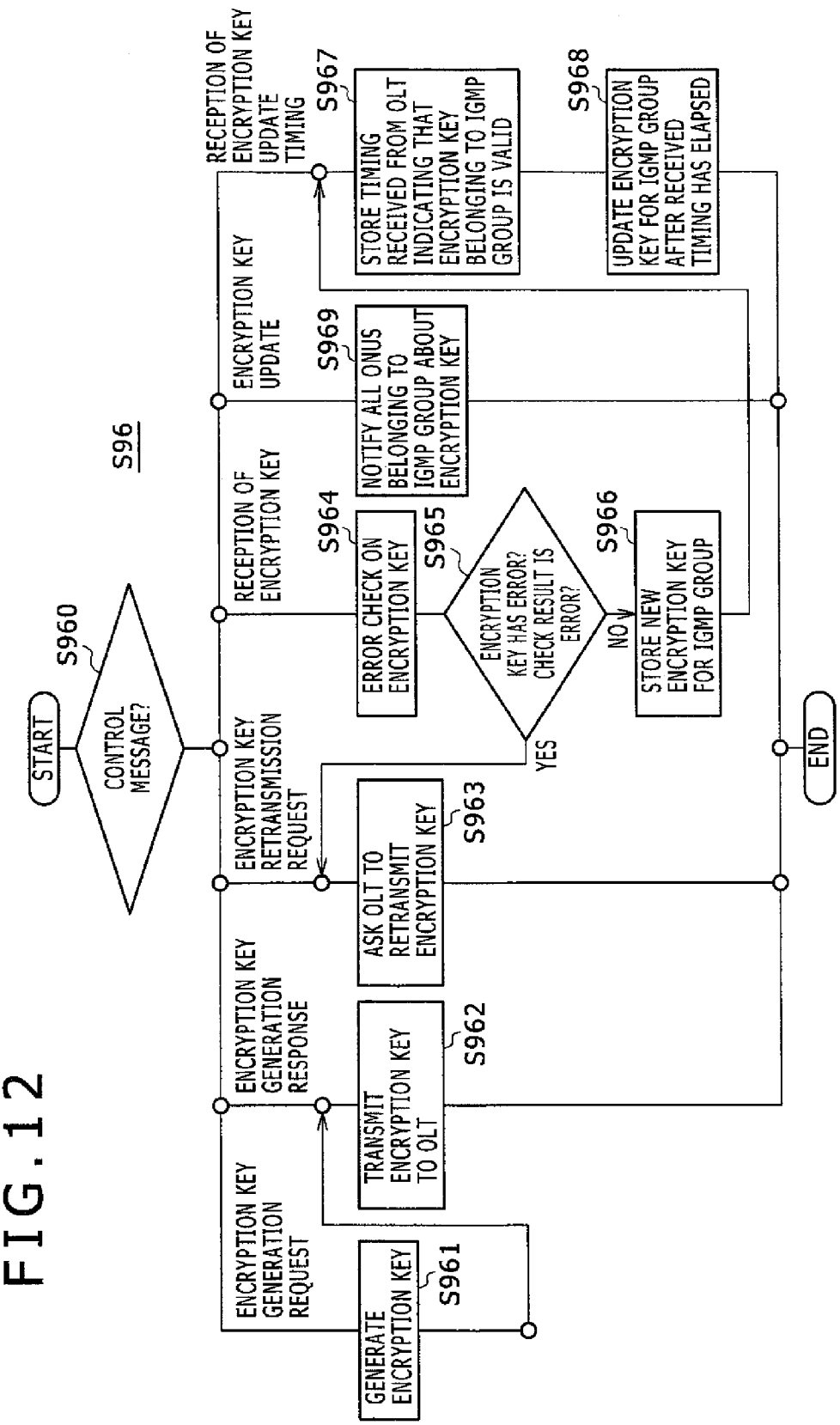
FIG. 12 is a flowchart of the control message process of the ONU.

The process of the ONU will be described with reference to FIGS. 11 and 12. In FIG. 11, the ONU 10 determines whether the received data is unicast data or multicast data (S81). When the data is unicast data, the ONU 10 determines whether the data is a control message or an IGMP message (S82). When the answer is an IGMP message, the ONU 10 obtains the MAC address and the IGMP group (S83). The ONU 10 determines whether the message is IGMP join or IGMP leave (S84). When the message is IGMP leave, the ONU 10 releases the corresponding MAC address from the IGMP group (S86). The ONU 10 determines the presence of a STB belonging to the IGMP group (S87). When the answer is YES, the ONU 10 deletes the IGMP group (S88), and ends the process. When the answer is NO in step 87, the ONU 10 just ends the process.

When the message is IGMP join in step 84, the ONU 10 determines whether the IGMP group is already present (S89). When the answer is YES, the ONU 10 discards the IGMP message (S91). The ONU 10 updates the MAC address-IGMP group corresponding table 50 (S92), and ends the process. When the answer is NO in step 89, the ONU 10 allows the IGMP message to pass to the ONU 10 (S93). The ONU 10 generates a new IGMP group (S94), and ends the process. When the data is a control message in step 82, the ONU 10 processes the control message (S96), and ends the process. When the data is multicast data in step 81, the ONU 10 searches for a STB belonging to the multicast group (S97). The ONU 10 obtains the encryption key for the multicast group from the retention table (S98). The ONU 10 encrypts the multicast signal (S99). The ONU 10 transmits the encrypted multicast signal only to the physical port that the STB belongs to (S101), and ends the process.

The process of the control message in step 96 will be described with reference to FIG. 12. In FIG. 12, the ONU 10 determines the type of the control message (S960). When the message is an encryption key generation request, the ONU 10 generates an encryption key (S961). The ONU 10 transmits the generated encryption key to the OLT 20 (S962), and ends the process. When the message is an encryption key generation response in step 960, the process moves to step 962. When the message is an encryption key retransmission request, the ONU 10 asks the OLT 20 to retransmit the encryption key (S963), and ends the process. When the message is an encryption key reception in step 960, the ONU 10 checks the encryption key to determine if an error has occurred (S964). The ONU 10 determines whether the result of the error check is an error (S965). When the answer is YES, the ONU 10 moves the process to step 963. When the answer is NO in step 965, the ONU 10 stores a new encryption key for the IGMP group (S966). The ONU 10 receives from the OLT 20 the timing in which the encryption key belonging to the IGMP group is valid, and stores the received timing (S967). The ONU 10 updates the encryption key information at the received timing (S968), and ends the process. Here, the Allocation-ID, the IGMP group, and the encryption key are updated.

When receiving an encryption key update in step 960, the ONU 10 notifies all the ONUs belonging to the IGMP group about the encryption key (S969), and ends the process. When receiving an encryption key update timing in step 960, the ONU 10 moves the process to step 967.

The OLT 20 receives the IGMP report message (Join) by the ANI 201. The OLT 20 decrypts the IGMP report message by the unicast data transmission/reception unit 202. Then, the IGMP snoop unit 203 analyzes the message. As a result of the analysis, the MAC address-IGMP group management unit 204 generates, stores, and manages the key management table 60.

The IGMP snoop unit 203 makes an inquiry to the MAC address-IGMP group management unit 204. When the other MAC address has been registered for the group indicated by the IGMP report message (Join), the IGMP snoop unit 203 does not transmit the IGMP report message to the upper data distribution network through the SNI 205. Meanwhile, when the IGMP group is not present, the IGMP snoop unit 203 transmits the IGMP report message to the SNI 205. The MAC address-IGMP group management unit 204 notifies the multicast encryption key management unit 206 about the information on the IGMP group and the ONU 10 that is the source of the IGMP report message as well as the information on whether the IGMP group is newly generated or an existing one.

When the IGMP group is newly generated, the multicast encryption key management unit 206 transmits an encryption key generation request to the ONU 10 through the control message processor 207, the unicast data transmission/reception unit 202, and the ANI 201.

On the other hand, when the IGMP group is already present, the multicast encryption key management unit 206 transmits the encryption key for the IGMP group as well as the information (Allocation-ID) indicating the IGMP group to the ONU 10 through the unicast data transmission/reception unit 202 and the ANI 201. Here, the information may be transmitted several times.

In the case in which the IGMP group is newly generated or the management period of the encryption key has elapsed, the ONU 10 receives an encryption key generation request, and transfers the received encryption key generation request to the control message processor 106. In response to the encryption key generation request, the control message processor 106 applies the encryption key generation request to the encryption key generator 107. Then, the control message processor 106 obtains the generated encryption key. The control message processor 106 transmits the encryption key to the OLT 20 through the data transmission/reception unit 104 and the ANI 105. Here, the encryption key may be transmitted several times.

On the other hand, when the IGMP group is already present, the ONU 10 receives the encryption key and checks the received encryption key by the encryption key check unit 108. When no error is found in the encryption key, the encryption key check unit 108 transmits the information on the IGMP group as well as the encryption key to the multicast encryption key management unit 109. The multicast encryption key management unit 109 records and manages the encryption key management table 70. The control message processor 106 transmits a positive confirmation response to the OLT 20 through the data transmission/reception unit 104 and the ANI 105.

When an error is found in the encryption key, the control message processor 106 transmits a negative confirmation response to the OLT 20 through the data transmission/reception unit 104 and the ANI 105, making a request to redistribute the encryption key.

The OLT 20 receives the encryption key as a response to the encryption key generation request, and passes the process to the encryption key check unit 208 through the control message processor 207. The encryption key check unit 208 checks the encryption key. When no error is found in the encryption key, the multicast encryption key management unit 206 stores and manages the encryption key management table 70. Incidentally, when an error is found in the encryption key, the control message processor 207 applies the encryption key generation request again to the ONU 10.

Thus, the OLT 20 and the ONU 10 share the encryption key by the steps described above. The OLT 20 provides the frame timing in which the encryption is valid to the Superframe counter 601 shown in the frame format in FIG. 7. The OLT 20 transmits the frame timing from the control message unit 207 to the ONU 10. The ONU 10 receives the frame timing. The control message processor 106 refers to the received frame timing, and transmits the frame count at which the encryption key is valid to the multicast signal decryption unit 110.

The encryption key change takes place in the following cases: when the STB belonging to the ONU 10, which is the encryption key generator, leaves from the IGMP group, when the other STBs of the ONU 10 do not belong to the specific IGMP group, or when predetermined time of several seconds has elapsed from when the encryption key for the specific IGMP group was last generated. The ONU 10 receives an IGMP message (leave) by the UNI 100, and analyzes the received IGMP message (leave) by the IGMP snoop unit 102 through the unicast data transmission/reception unit 101. The MAC address management unit 103 discards the IGMP group information associated with the corresponding MAC address. The IGMP snoop unit 102 transparently passes the IGMP message (leave) to the data transmission/reception unit 104, thereby transmitting to the OLT 20 through the ANI 105.

The OLT 20 receives the IGMP message (leave) by the ANI 201, and analyzes the received IGMP message (leave) by the IGMP snoop unit 203 through the unicast data transmission/reception unit 202. The MAC address-IGMP group management unit 204 receives the analysis result. When it is the IGMP leave message from the ONU which is the encryption key generator of the group, the MAC address-IGMP group management unit 204 eliminates the correspondence between the STB and the IGMP group. The MAC address-IGMP group management unit 204 selects the ONU that accommodates the STB belonging to the IGMP group, as a new encryption key generator. Then, the MAC address-IGMP group management unit 204 transmits a key change request to the control message processor 207.

Thus, the OLT 20 receives the multicast signal by the SNI 205 by the steps described above. The multicast data encryption unit 209 makes an inquiry to the multicast encryption key management unit 206 about the encryption key corresponding to the IGMP group. The multicast data encryption unit 209 encrypts the multicast signal. Then, the multicast data transmission unit 210 transmits the multicast signal to the ONU 10 through the ANI 201.

The ONU 10 receives the multicast signal by the ANI 105, and decrypts the encrypted multicast signal by the multicast data decryption unit 110 through the data transmission/reception unit 104. The multicast data decryption unit 110 makes an inquiry to the multicast encryption key management unit 109, and decrypts the multicast signal of the IGMP group. The multicast encryption key management unit 109 identifies the received multicast signal and the encryption key in the Alloc-ID (Allocation-ID) 602. When the multicast signal is of the IGMP group not requested by the STB 30 connected to the ONU 10, the multicast encryption key management unit 109 discards the frame.

What is claimed is:

1. An optical network system in which an optical line terminal installed in a station and a plurality of optical network units installed in subscribers' homes are connected by an optical distribution network, wherein the optical network unit performs the steps of:
when receiving a report message from a set top box, analyzing the report message, storing a group that the set top box belongs to as well as a MAC address in a first table, and transferring the report message to the optical line terminal;
when receiving an encryption key generation request from the optical line terminal, generating an encryption key, associating the encryption key with the MAC address in the first table, and transmitting the generated encryption key to the optical line terminal as an encryption key generation response; and
when receiving a notice of timing from the optical line terminal, updating the encryption key of the belonging group at the received timing, and wherein the optical line terminal performs the steps of:
when receiving a report message from the set top box through the optical network unit, analyzing the report message, storing the group that the set top box belongs to as well as the optical network unit in a second table, and transmitting the encryption key generation request to the optical network unit; and
when receiving the encryption key generation response from the optical network unit, further storing the encryption key in the second table, and transmitting the notice of timing in which the encryption key is valid to the optical network unit.

2. The optical network system according to claim 1, wherein the optical line terminal further stores a key retention period for each belonging group, and when the key retention period of a first belonging group has elapsed, the optical line terminal selecting the optical network unit for which the encryption key is generated, from the optical network units belonging to the first belonging group, and updating a correspondence between the first belonging group and the encryption key.

3. The optical network system according to claim 1, wherein a message including the report message, the encryption key generation request, and the encryption key generation response are communicated through an encryption unicast channel.

4. A method of changing encryption keys comprising the steps of:

when receiving a report message from a set top box, analyzing the report message by an optical network unit;

storing by the optical network unit a group that the set top box belongs to as well as a MAC address in a first table;

transferring by the optical network unit the report message to an optical line terminal;

when receiving the report message from the optical network unit, analyzing the report message by an optical line terminal;

storing by the optical line terminal the group that the set top box belongs to as well as an optical network unit in a second table;

transmitting by the optical line terminal an encryption key generation request to the optical network unit;

when receiving the encryption key generation request from the optical line terminal, generating an encryption key by the optical network unit; and associating the encryption key with the MAC address in the first table by the optical network unit;

transmitting by the optical network unit the generated encryption key to the optical line terminal as an encryption key generation response;

when receiving the encryption key generation response from the optical network unit, further storing by the optical line terminal the encryption key in the second table;

transmitting by the optical line terminal a notice of timing in which the encryption key is valid to the optical network unit; and when receiving the notice of timing from the optical line terminal, updating by the optical network unit the encryption key of the belonging group.

\* \* \* \* \*